United States Patent
Harris et al.

(10) Patent No.: US 7,535,148 B2
(45) Date of Patent: May 19, 2009

(54) ELECTROMAGNETIC DEVICE FOR CONVERTING MECHANICAL VIBRATIONAL ENERGY INTO ELECTRICAL ENERGY, AND MANUFACTURE THEREOF

(75) Inventors: Nicholas Robert Harris, Camberley (GB); Michael John Tudor, Southsea (GB); Neil Maurice White, Southampton (GB); Stephen Paul Beeby, Southampton (GB); Peter Glynne-Jones, Luton (GB)

(73) Assignee: University of Southampton, Hampshire (GB)

( * ) Notice: Subject to any disclaimer, the term of this patent is extended or adjusted under 35 U.S.C. 154(b) by 503 days.

(21) Appl. No.: 10/569,631

(22) PCT Filed: Aug. 13, 2004

(86) PCT No.: PCT/GB2004/003508

§ 371 (c)(1),
(2), (4) Date: Feb. 27, 2006

(87) PCT Pub. No.: WO2005/022726

PCT Pub. Date: Mar. 10, 2005

(65) Prior Publication Data

US 2007/0007827 A1    Jan. 11, 2007

(30) Foreign Application Priority Data

Aug. 28, 2003 (GB) .................................. 0320180.3
Mar. 26, 2004 (GB) .................................. 0406862.3

(51) Int. Cl.
    *H02K 21/12* (2006.01)
(52) U.S. Cl. ............................. 310/156.56; 310/156.09; 310/15
(58) Field of Classification Search ............ 310/156.56, 310/156.09, 15–24, 36–39
    See application file for complete search history.

(56) References Cited

U.S. PATENT DOCUMENTS

| 4,602,174 | A | 7/1986 | Redlich | |
|---|---|---|---|---|
| 5,892,311 | A * | 4/1999 | Hayasaka | 310/166 |
| 6,375,759 | B1 | 4/2002 | Christenson et al. | |
| 6,972,504 | B1 * | 12/2005 | Hsu | 310/156.56 |
| 7,382,072 | B2 * | 6/2008 | Erfourth | 310/156.09 |
| 2002/0050744 | A1 | 5/2002 | Bernstein et al. | |
| 2005/0001505 | A1 * | 1/2005 | Hsu | 310/156.56 |
| 2006/0267415 | A1 * | 11/2006 | Qiu | 310/12 |

FOREIGN PATENT DOCUMENTS

| DE | 19852470 A1 | 5/2000 |
|---|---|---|
| DE | 10055080 A1 | 5/2002 |
| EP | 0977345 A2 | 2/2000 |
| EP | 1146476 A1 | 10/2001 |
| GB | 2285543 A | 7/1995 |

(Continued)

*Primary Examiner*—Gary F. Paumen
(74) *Attorney, Agent, or Firm*—Sughrue Mion, PLLC

(57) ABSTRACT

An electromagnetic generator comprising a multilayer assembly of a first layer carrying at least one magnet, a second layer carrying at least one coil, and a third layer carrying at least one magnet, the at least one magnet of the first and third layers being configured to define therebetween a region of magnetic flux in which the at least one coil is disposed, at least one of the layers being shaped to define a respective displaceable portion thereof which is displaceable by vibration of the electromagnetic generator thereby to cause relative movement between the coil and the magnets and generate an electrical current in the coil.

25 Claims, 6 Drawing Sheets

FOREIGN PATENT DOCUMENTS

| | | |
|---|---|---|
| GB | 2311171 A | 9/1997 |
| JP | 57-103171 A | 6/1982 |
| JP | 6-141524 A | 5/1994 |
| JP | 7-131967 A | 5/1995 |
| JP | 2000-32732 A | 1/2000 |
| JP | 2000-201471 A | 7/2000 |

* cited by examiner

ELECTROMAGNETIC DEVICE FOR CONVERTING MECHANICAL VIBRATIONAL ENERGY INTO ELECTRICAL ENERGY, AND MANUFACTURE THEREOF

The present invention relates to an electromagnetic generator for converting mechanical vibrational energy into electrical energy, and to a method of manufacturing such an electromagnetic generator. The present invention also relates to a magnetic core for an electromagnetic generator for converting mechanical vibrational energy into electrical energy, to such an electromagnetic generator including such a core, and to a method of producing a magnetic core for an electromagnetic generator. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

It is known to use an electromagnetic generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

In a paper entitled "Design and fabrication of a new vibration based electromechanical power generator", by Glynne-Jones et al, published in Sensors and Actuators A92, 2001, pp. 335-342, an electromechanical generator was disclosed consisting of a cantilever beam supported by a housing. A mass on the beam was made up of two magnets mounted on a keeper to form a C-shaped core. A coil was placed in the air-gap between the magnets at right angles to the direction of movement of the mass on the cantilever beam. While this prior disclosure by some of the present inventors produced a useful electromechanical generator, there is still a need to enhance the efficiency of the conversion of mechanical vibration energy into electrical energy, and thereby into useful electrical power.

In a later paper entitled "An electromagnetic, vibration-powered generator for intelligent sensor systems", by P Glynne-Jones, M J Tudor, S P Beeby, N M White, Department of Electronics and Computer Science, University of Southampton, Southampton, SO17 1BJ, Hampshire, England, which was published at a conference entitled "Eurosensors XV1" held in 2002 in Prague, Czech Republic, an improved electromechanical generator was disclosed. The electromechanical generator incorporated four magnets, which created a magnetic field through a greater proportion of the length of each coil winding when compared to double or single magnet designs. The magnets and core structure of the device are illustrated in FIG. 1.

A web page "http://www.iee.org/oncomms/pn/measurement/Steve%20Beeby.pdf" is a copy of a presentation entitled "Kinetic energy harvesting for wireless energy systems" by S P Beeby et al, made at the Institute of Electrical Engineers (IEE) in the United Kingdom at a seminar on "Wheatstone Measurement" held on 11 Dec. 2002. That presentation similarly disclosed the structure and use of an electromechanical generator having the magnet, core and coil construction shown in FIG. 1.

For each of these latter two prior disclosures made by some of the present inventors, although the disclosed electromechanical generator had a good efficiency, there is still a need to improve the design to enhance the efficiency of electrical power generation from mechanical vibrations, and to provide an improved manufacturing method, in particular so as to provide a low production cost.

The magnetic core structure, designated generally as 2, in FIG. 1 comprises four magnets 4,6,8,10. Each magnet 4,6,8, 10 is substantially block shaped having opposed ends of opposite polarity. The four magnets 4,6,8,10 are disposed in two magnet pairs, with each pair of magnets 4,6;8,10 being assembled with a respective keeper plate 12,14 of ferromagnetic material, for example steel. For each pair of magnets 4,6;8,10, the end of one magnet (for example magnet 4) having a first polarity (for example N for the magnet 4 in FIG. 2) is assembled against the respective keeper plate (for example keeper plate 12 in FIG. 2) and an end of opposite polarity (for example S) of the other magnet (magnet 6 in FIG. 1) is assembled against the same keeper plate (keeper plate 12). The two pairs of magnets 4,6;8,10 are mounted in an opposing manner, with magnet ends 16,18;20,22 of opposite polarity spaced from and facing each other, and with the magnetic flux being guided around the two opposed outside edges of the magnetic core 2 by means of the two keeper plates 12,14, thereby to define a magnetic circuit.

With this arrangement, a single elongate slot 24 is defined between the two opposed magnet pairs 4,6 and 8,10 and there are also defined in the magnetic circuit two air gaps 26,28 therein, each air gap 26,28 being defined between respective opposed magnet ends 16,18;20,22. As shown in FIG. 1, the coil 30 is disposed in the slot 24. The magnetic circuit is mounted on a cantilever beam (not shown), for example a U-shaped member, with each end of the U-shaped member connected to a respective pair of magnets 4,6;8,10. When the electromechanical generator is subject to mechanical vibration, the cantilever beam can correspondingly vibrate, in an up and down direction with respect to the magnetic circuit, as shown by the arrows indicating magnet movement in FIG. 1. This causes an electrical current to be generated in the coil 30.

For each of these latter two prior disclosures made by some of the present inventors, although the disclosed electromechanical generator had an improved efficiency as a result of a magnetic field being created through a greater proportion of the length of each coil winding when compared to double or single magnet designs, there is still a need to improve the design to enhance the efficiency of electrical power generation from mechanical vibrations.

U.S. Pat. No. 6,304,176 in the name of Rockwell Technologies LLC discloses a parasitically powered sensing device for monitoring an industrial system. A tuned transducer converts stray energy emitted by the system into an electrical potential for consumption by a remote sensing device and/or a wireless communications link. The parasitic transducer may be a piezo-electric crystal element coupled to a tuned mechanical oscillator. Alternatively, the sensing element and transducer may be in the form of a micromechanical system. However, no specific magnet, core and coil arrangement is disclosed.

The present invention aims to provide to an improved electromagnetic device for converting mechanical vibrational energy into electrical energy, and to an improved method for its manufacture.

The present invention also aims to provide to an electromagnetic device for converting mechanical vibrational energy into electrical energy which has a greater energy conversion efficiency than known devices.

The present invention accordingly provides an electromagnetic generator comprising a multilayer assembly of a first layer carrying at least one magnet, a second layer carrying at least one coil, and a third layer carrying at least one magnet, the at least one magnet of the first and third layers being configured to define therebetween a region of magnetic flux in which the at least one coil is disposed, at least one of the layers being shaped to define a respective displaceable portion thereof which is displaceable by vibration of the electromagnetic generator thereby to cause relative movement between the coil and the magnets and generate an electrical current in the coil.

The present invention yet further provides a method of manufacturing an electromagnetic generator, the method comprising the steps of:

(a) forming a first layer carrying at least one magnet, forming a second layer carrying at least one coil and forming a third layer carrying at least one magnet, at least one of the layers being shaped to define a respective displaceable portion thereof which is displaceable by vibration, the displaceable portion carrying either the at least one magnet of the first and third layers or the at least one coil of the second layer; and (b) assembling together the first, second and third layers to form a multilayer structure in which the magnets of the first and third layers are configured to define therebetween a region of magnetic flux in which the at least one coil is disposed, the at least one displaceable portion being displaceable by vibration of the multilayer structure thereby to cause relative movement between the coil and the magnets and generate an electrical current in the coil.

The present invention yet further provides an electromagnetic generator comprising at least two magnets and at least one coil disposed therebetween, the at least two magnets being configured to define therebetween a region of magnetic flux in which the at least one coil is disposed whereby relative movement between the coil and the magnets generates an electrical current in the coil, and at least one piezoelectric region which is adapted to generate additional electrical current by relative movement between the coil and the magnets.

The present invention also provides a magnetic core for an electromagnetic generator, the magnetic core comprising four magnets disposed in two magnet pairs, with each pair of magnets being assembled with a respective keeper, the two pairs of magnets being mounted in an opposing manner so that a front end of each magnet of one magnet pair is spaced, in a first direction, from and faces a front end of a corresponding magnet of the other magnet pair, the facing front ends being of opposite magnetic polarity, thereby to define in the magnetic core a pair of gaps between the front ends of the four magnets, and with rear ends of the magnets of each pair contacting a respective keeper, the magnets of each pair being mutually spaced in a second direction, and wherein the ratio between the width of each magnet in the second direction to the height of the magnetic core in the second direction is from 0.4 to 0.55.

The present invention further provides an electromagnetic generator, the electromagnetic generator comprising a magnetic core according to the present invention, a coil disposed in the pair of gaps and a vibration sensitive mount for mounting one of the magnetic core and the coil whereby vibration of the electromagnetic generator causes relative movement of the magnetic core and the coil thereby to generate an electrical current in the coil.

The present invention yet further provides a method of producing a magnetic core for an electromagnetic generator, the magnetic core comprising four magnets disposed in two magnet pairs, with each pair of magnets being assembled with a respective keeper, the two pairs of magnets being mounted in an opposing manner so that a front end of each magnet of one magnet pair is spaced, in a first direction, from and faces a front end of a corresponding magnet of the other magnet pair, the facing front ends being of opposite magnetic polarity, thereby to define in the magnetic core a pair of gaps between the front ends of the four magnets, and with rear ends of the magnets of each pair contacting a respective keeper, the magnets of each pair being mutually spaced in a second direction, the method comprising the steps of:

(a) establishing a model for the geometrical parameters of the magnetic core, the parameters including the width of each magnet in the second direction ($t_m$), the height of the magnetic core in the second direction ($l_c$), the length of each magnet in the first direction ($l_m$) and the length of the gap in the first direction (g);

(b) varying the parameters to provide an output value $\psi$, which is defined by the equation $$\psi = \frac{\int^{airgap} B^2 dA}{\text{total area of core}};$$

wherein B is the magnet flux density; and

A is the total face area of each magnet pair of the core, the faces defining the air gaps; and the total area of the core is the total face area of each magnet pair plus the face area of the gap therebetween.

(c) determining a maximum for the parameter $\psi$;

(d) determining values of at least the parameters ($t_m$), ($l_c$), ($l_m$) and (g) to provide a range for the parameter $\psi$ which encompasses the maximum for the parameter $\psi$; and (e) producing the magnetic core having the determined values of the parameters ($t_m$), ($l_c$), ($l_m$) and (g) within a particular tolerance.

The electromechanical generator of the present invention has particular application in the provision of electrical power to sensor systems. In accordance with the invention, typical application areas for such self powered intelligent sensor systems are: inside or on the body (e.g. human, animal); on rotating objects; within liquids such as molten plastic or setting concrete; structural monitoring such as within bridges, buildings, aircraft or roads; and environmental monitoring, such as pollution monitoring in fields.

The electromagnetic generator in accordance with the present invention has a number of potential uses and applications, particularly when miniaturised. For example, the electromagnetic generator is really useful in applications where cabling to a unit (e.g a sensor unit) requiring electrical power is difficult and/or expensive and battery power is insufficient in the life of the unit, weight is important and there is a significant level of vibration available to harvest power from. In some cases the vibration harvesting technology of the electromagnetic generator may be used to provide a charging facility to a battery powered system.

In one particularly preferred application, the electromagnetic generator of the present invention may be incorporated into Health and Usage Monitoring Systems (HUMS) for helicopters and fixed wing aircraft.

HUMS systems monitor vibration and other parameters related to helicopter (or other aircraft) condition and the number of hours flying in defined stress conditions. The installation of sensors and retrieving data from those devices is a major cost issue both at installation and also during planned maintenance. The benefits of the electromagnetic generator of the present invention are reduced installation costs and shorter time taken for maintenance. The sensor would be packaged with a local wire less transmission system and would transmit data to the HUMS monitoring system. Some advantages of using the electromagnetic generator powered sensor system is that the complexity of installing wiring on existing or new airframes is avoided and the weight of the cabling is eliminated. Also monitoring sensors can be mounted for short trial periods without high installation costs.

In another particularly preferred application, the electromagnetic generator of the present invention may be incorporated into sensing systems for railway lines and associated components.

The condition of railway lines and associated components is a matter of concern within the UK and probably throughout the world. It is known to provide sensor systems for sensing for rail condition and also the presence/absence of vital components. In some situations there is adequate local electrical power for driving a sensor. However, in other situations local electrical power may be unavailable or inconvenient, particularly for remote or distant sites, in which case there is a need for a self powered sensor (e.g. a strain sensor) that could telemeter the output data to a single powered point (one for a large geographical area) or via a GPS link. The vibration for the sensor may be provided by the passage of a train, either directly from the rail line or via a cantilever attached to the line. Other railway infrastructure monitoring includes, for example, strain measurement in rails, ballast condition and height, and points monitoring.

In a yet further particularly preferred application, the electromagnetic generator of the present invention may be incorporated into a vehicle battery charger system, for example for lorry or truck trailers tracking battery recharging.

Articulated trailers need to be tracked for logistics applications. In this application the trailer is only powered when the trailer is connected to a tractor unit. Even then there may be no power available for a retrofitted tracking system. If the system is powered by a battery it would be an advantage to have an independent charging system that would charge the battery whilst the system was being towed. The charging system may incorporate the electromagnetic generator of the present invention. The battery would then be able to power the tracking system while the trailer was stationary and disconnected from the tractor unit.

In a still further particularly preferred application, the electromagnetic generator of the present invention may be incorporated into a mobile telecommunications equipment, for example military back-pack telecommunications equipment (e.g. Bowman), which is powered by a battery. Batteries contribute to a significant proportion of the overall weight of the equipment carried in the field. Clearly during field operation the equipment is subjected to considerable vibration. These vibrations could be transformed by the electromagnetic generator of the present invention into electrical power that is suitably conditioned for use in recharging the battery packs. The electromagnetic generator of the present invention can reduce the weight and maintain the power available of the telecommunications equipment, thereby providing real benefits to the user.

In other preferred applications, the electromagnetic generator of the present invention may be incorporated into a conditioning monitoring system which is increasingly used in a very wide field for many types of equipment. For example, the electromagnetic generator of the present invention may be used to power a vibration condition monitoring sensor on any type of equipment.

Embodiments of the present invention will now be described by way of example only with reference to the accompanying drawings, in which.

Figure 9:
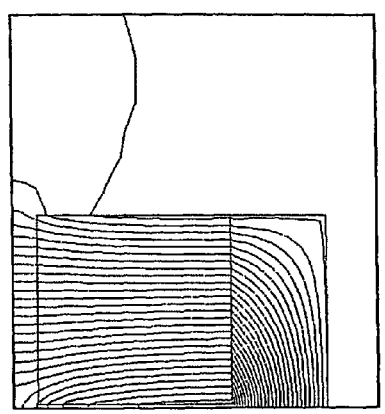
Figure 10:
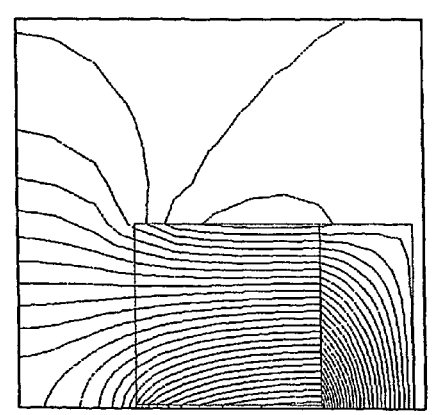
Figure 11:
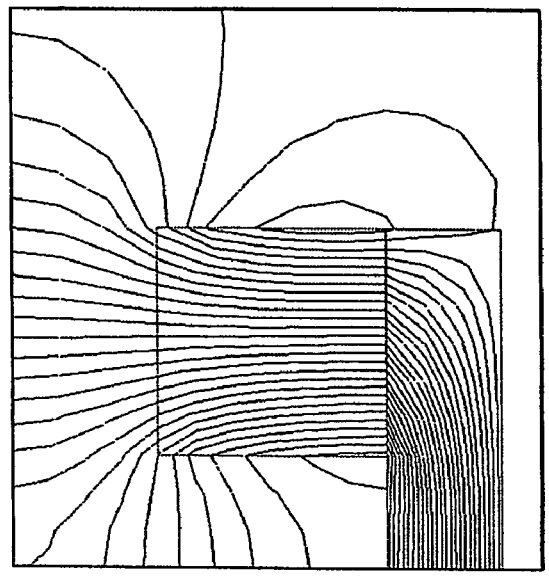
Figure 12:
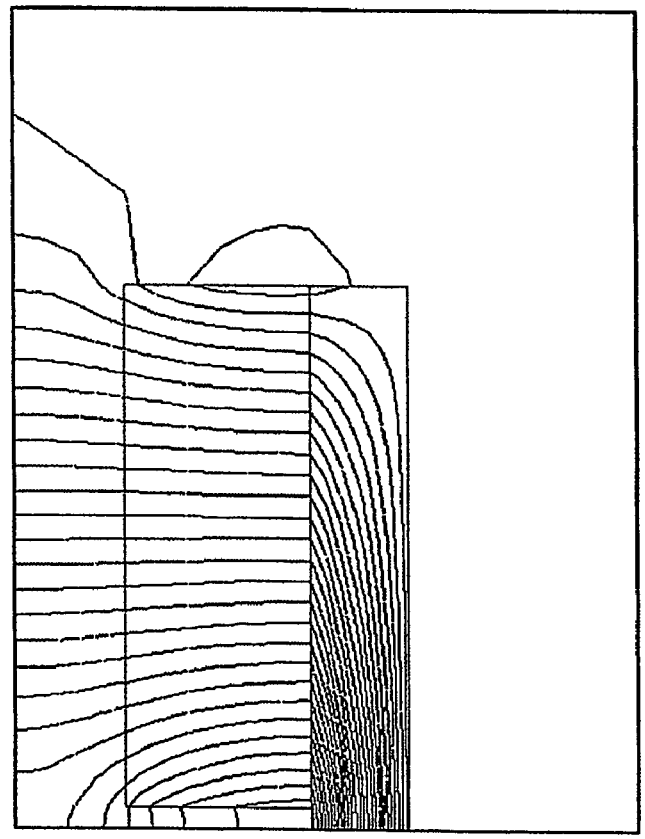

FIG. 9, FIG. 10 and FIG. 11 show typical magnetic flux patterns of magnetic cores which have been calculated in accordance with the model used in the invention for different extremes of geometrical configuration of the magnetic core; and FIG. 12 shows a magnetic field pattern for a magnetic core of an electromechanical generator in accordance with a preferred embodiment of the present invention A magnet-coil generator in accordance with the present invention consists of a spring-mass combination attached to a magnet or a coil in such a manner that when the system resonates, the coil cuts through the flux formed by the magnet as a result of relative movement between the magnet and the coil. The spring-mass is typically a cantilever beam which can either be connected to the magnet, with the coil fixed relative to an enclosure for the magnetic coil generator, or vice versa. The two possible geometries are referred to as a moving magnet geometry or a moving coil geometry.

Figure 2:
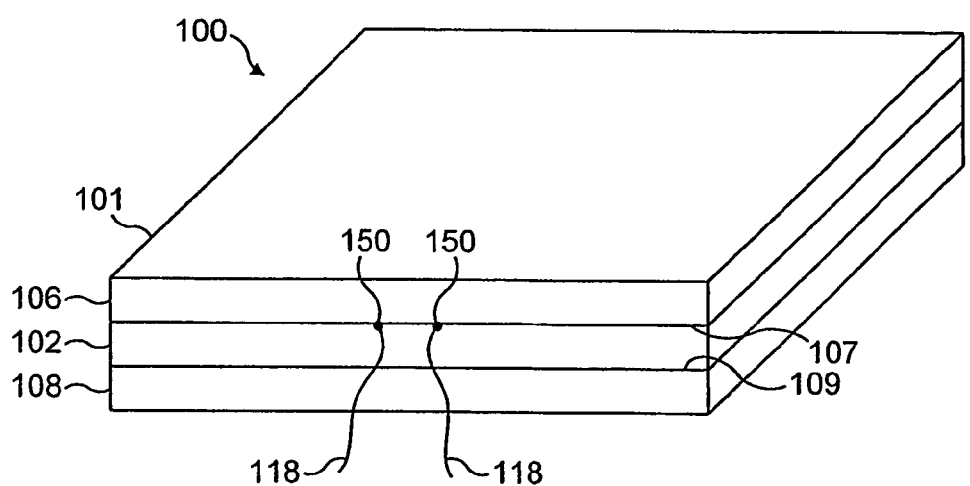
FIG. 2 is a schematic perspective view of an electromechanical generator in accordance with a first embodiment of the present invention.
Figure 3:
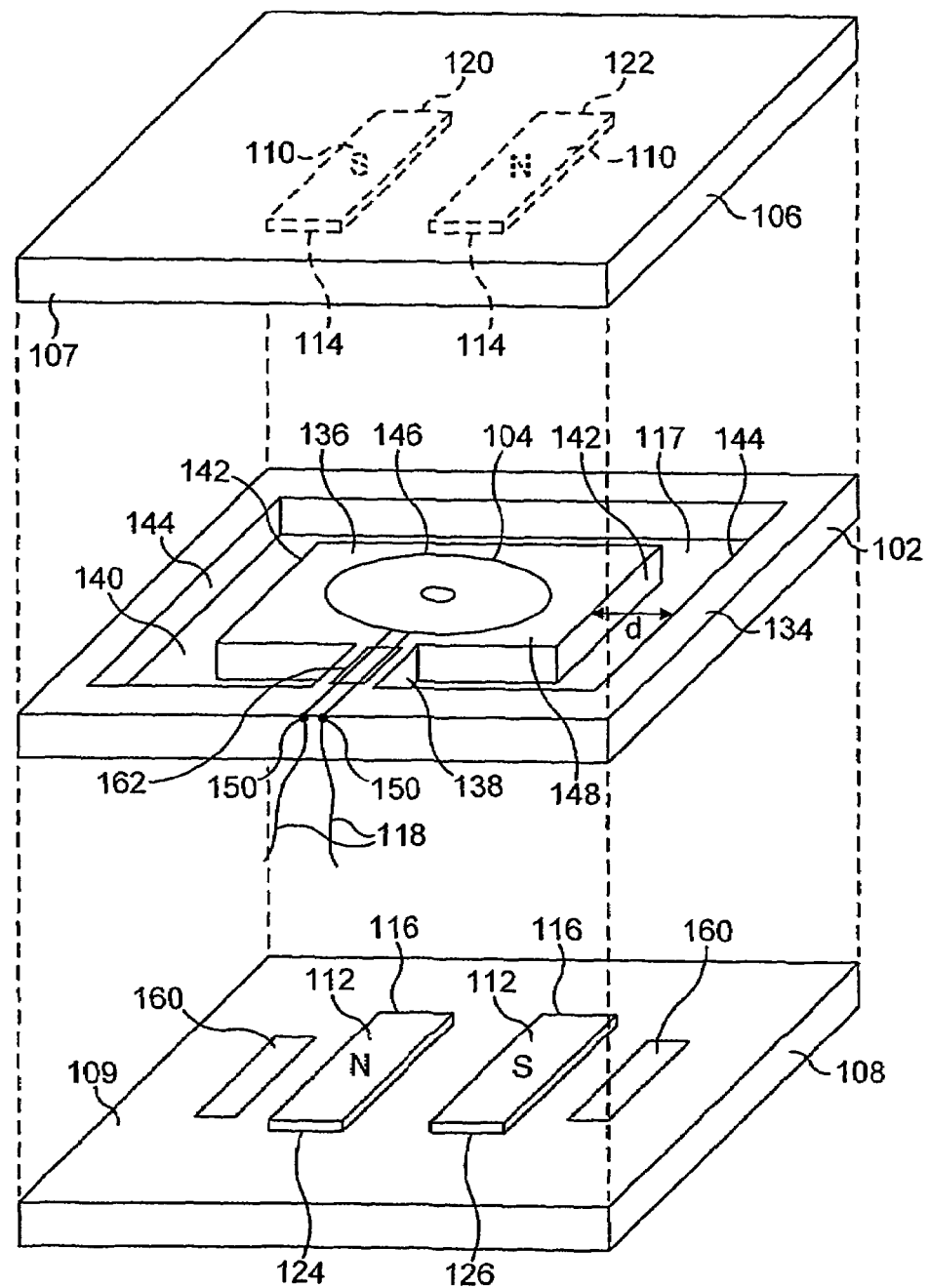
FIG. 3 is a schematic perspective exploded view of the electromechanical generator of FIG. 2.
Figure 4:
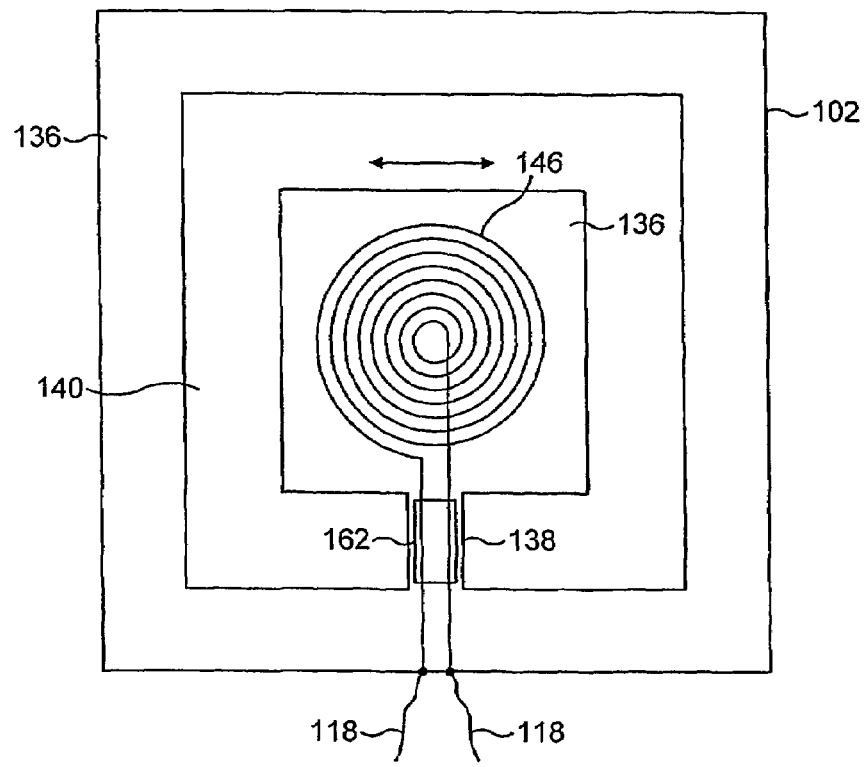
FIG. 4 is a schematic plan view of the structural arrangement of the coil and cantilever in the electromechanical generator of FIG. 2.

Referring to FIGS. 2 to 4, an electromagnetic generator, designated generally as 100, in accordance with an embodiment of the present invention comprises a multilayer structure 101, in which a number of layers are sandwiched together. A central layer 102 is provided with a coil 104 and two opposed outer layers 106,108, each being disposed on a respective side of the central layer 102, are each provided on their inner face 107, 109 with respective magnets 110,112. The magnets 110, 112 may alternatively be provided on the respective outer face of the outer layers 106, 108. The magnet faces 114, 116 which are disposed towards the coil 104 have opposite polarity, so that magnetic flux extends therebetween. The coil 104 is free to be moved, as a result of vibration applied to the electromagnetic generator 100, in a cavity 117 defined between the two opposed outer layers 106,108. The coil 104 moves in the plane of the central layer 102. The movement direction is shown by the arrows in FIG. 4. The magnets 110,112 are located so that their magnetic flux is cut by movement of the coil 104, whereby an electrical current is generated in the coil 104. Such a current is fed along bond wires 118 connected to the coil 104.

As shown more clearly in FIG. 3, in the electromechanical generator of the invention the magnets poles facing each other on opposite sides of the coil 104 have opposite polarity (i.e. one is north N and one is south S). If there are two magnets on each opposite side of the coil 104, and thus four magnets in total, each magnet pair face each other with poles of opposite polarity (i.e. one is north N and one is south S), and on each side of the coil there is one magnet face of each polarity (i.e. one is north N and one is south S).

The multilayer structure 101 typically has a thickness of from 1.5 to 2 mm, and typically has dimensions of about 5 mm by 5 mm in plan.

Each of the outer layers 106, 108 typically has a thickness of from 0.5 to 0.75 mm. The outer layers are most typically composed of borosilicate glass (such as that available in commerce under the Trade Mark "Pyrex"®), but alternatively may be composed of other materials available commercially in wafer form, for example silicon or gallium arsenide, or alternatively may be composed of materials which are compatible with thick film processing, for example alumina, steel or metallic alloys, such as for example Inconel.

The outer layers 106, 108 are most preferably produced using steps employed for wafer technology. Thus a single wafer is processed by a series of steps which commonly produce a plurality (typically hundreds) of outer layers all integral on the common wafer. As described below, two wafers incorporating the outer layers are bonded to opposed sides of a central wafer correspondingly incorporating a plurality of the central layers 102 the and then, after bonding of the wafers together, the composite three wafer assembly is cut (or diced) to form a plurality of separate and individual bonded assemblies, each including two outer layers 106, 108 with a central layer 102 sandwiched therebetween.

Each of the outer layers 106, 108 is provided thereon with a pair of spaced magnets 120,122; 124,126 which have been applied to a surface of the respective wafer to form the respective outer layers 106, 108. Typically, the magnets 120,122; 124,126 are thick film magnets which have been produced by screen-printing an ink including magnetic or magnetisable material onto the surface of the wafer which is ultimately to form the respective outer layer 106, 108. Alternatively, the magnets 120,122; 124,126 may be fabricated by other methods, such as thin film deposition or electroplating. After the magnetic layers have been formed, the magnets are polarised to the correct polarity.

In an alternative embodiment, only a single magnet is provided on each of the two outer layers 106, 108.

In a further alternative embodiment, the magnetic layers may be provided on the outer surface of the outer layers 106, 108 rather than in the cavity 117 defined between the outer layers 106, 108.

Figure 5:
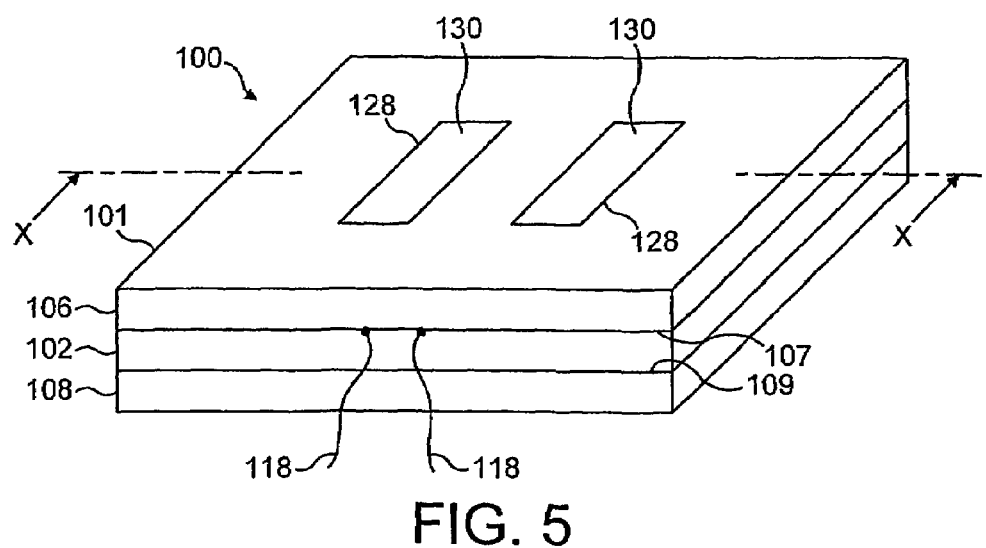
FIG. 5 is a schematic perspective view of an electromechanical generator in accordance with a further embodiment of the present invention.

In a yet further embodiment, instead of forming magnetic layers on the surface of the outer layers 106, 108, as shown in FIG. 5 recesses 128 are etched in the outer layers 106, 108 and bulk pre-formed and pre-polarised magnets 130 are inserted into the recesses 128 and fixed therein, for example by adhesive. In this embodiment, there are two magnets 130 on each of the outer layers 106, 108 and the magnets are on the outer surface of the respective layers 106, 108. However, there could be only one magnet 130 on each of the outer layers 106, 108.

The bulk magnets 130 may however be disposed so as to be located either in the cavity 117 between the outer wafers or on the outside of the multilayer structure. The use of such bulk magnets can provide higher magnetic flux than achievable with magnetic layers and also avoids an additional polarising step which is needed to form magnets of the required polarity from the applied magnetic layers. The bulk magnets typically have dimensions of 1 mm by 1 mm in plan and a thickness of about 0.75 mm.

When bulk magnets are employed, to improve the degree of coupling, it is desirable to choose a type of magnet that will produce a strong flux density. Rare earth magnets are ideal for this application, and offer up to 5 times the magnetic energy density of conventional Alnico magnets. Neodymium Iron Boron (NdFeB) magnets have the most powerful magnetic properties per cubic cm known at this time, and can operate at up to 120° C. If higher temperature operation is required, the less powerful Samarium Cobalt can be used, with a working temperature of up to 250° C.

The central layer 102 is separately fabricated using wafer technology, as used for the outer layers 106, 108, and is also composed of a material which is commercially available in wafer form, for example borosilicate glass, silicon or gallium arsenide, or of a material compatible with thick form processing, for example alumina, steel or metallic alloys such as Inconel. Most typically, the central layer 102 is composed of silicon, because silicon has good mechanical properties for use in forming a cantilever beam as described below.

The central layer 102 comprises a peripheral frame 134 surrounding a central body 136, referred to as a paddle, which is attached to the peripheral frame 134 by a single beam element 138, thereby forming a cantilever. The paddle 136 is surrounded, apart from the beam element 138, by a cutout 140 extending through the thickness of the central layer 102. The beam element 138 is dimensioned so that it is flexible, thereby allowing movement of the paddle 136 within the cutout 140, in the plane of the central layer 102 but stiff with respect to movement out of the plane of the central layer 102. If desired, additional stiffness and control of the movement of the central paddle 136 may be incorporated by including additional beam elements between the central paddle 136 and the surrounding peripheral frame 134. The spacing "d" between the sides 142 of the central paddle 136 and the opposed facing sides 144 of the surrounding peripheral frame 134 is selected so as to be slightly larger than a preset maximum working amplitude of vibration of the central paddle 136, but so that the relatively thin beam element 138 does not break or otherwise become damaged if the central paddle 136 inadvertently hits the surrounding peripheral frame 134.

The structure of the central layer 102 is achieved by etching a wafer, for example by deep reactive ion etching, so as to form an opening defining the cutout 140 between the peripheral frame 134 and the central paddle 136.

The central paddle 136 incorporates one or more integrated coils 146 on one or both faces 148 thereof. Most preferably, the or each coil 146 is produced on a respective surface of the central paddle 136 so as to be integrally formed on the surface, for example by thick film printing or electrochemical deposition. The or each coil 146 is dimensioned so as to maximally cut the magnetic flux produced by the magnets 110, 112 when the centre paddle 136 is vibrated laterally at its full amplitude in the ultimate electromagnetic generator 100. Thereafter, electrical connections 150 to the or each coil 146 are formed on the wafer so as to permit bond wires 118 subsequently to be attached to the coil 146. The electrical connections may be produced by a number of well-known methods, such as indiffusion or metallisation.

In a particularly preferred embodiment, at least one region of piezoelectric material is additionally provided in the electromagnetic generator so that the device generates electrical current as a result of external vibration not only by movement of a coil through magnetic flux but also by the application of stress to the piezoelectric material.

In accordance with an embodiment incorporating this aspect of the present invention, at least one area of active piezoelectric material 160 is printed onto one or both of the outer layers 106, 108 wafers which carry the magnets 110, 112 in the region where the paddle 136 of the central layer 102 would impact in the event of movement of the paddle 136 beyond a preset maximum amplitude. In addition, or alternatively, at least one area 162 of active piezoelectric material is preferably printed on any additional strained part of the material, such as the supporting beam element 138 for the paddle 136. Such additional areas of active piezoelectric material are connected electrically (by means not shown) to the bond wires 118. The provision of such additional piezoelectric material permits the generation of additional useful electrical energy harvested from the piezoelectric effect in addition to that harvested by the movement of the coil in the magnetic flux generated by the magnets.

The three layers, comprising the outer layers 106, 108 and the central layer 102, are assembled together to form a multilayer assembly. The assembly process may assemble all three layers together either simultaneously or consecutively. The layers are typically bonded together using a wafer bonding technique such as silicon fusion bonding or electrostatic bonding.

If necessary, so as to ensure an appropriate clearance between the paddle 136 and the magnets 110, 112, to enable unimpeded movement of the paddle 136 relative to the magnets 110, 112, a peripheral spacer (shown as 170 and 172 in the embodiment of FIG. 6) may be provided on each side of the central layer 102 between the central layer 102 and the respective outer layer 106, 108. Alternatively, the thickness of the paddle 136 may be reduced, for example by etching, during its formation in order to accommodate the magnets 110, 112, thus avoiding the need for a peripheral spacer.

Figure 6:
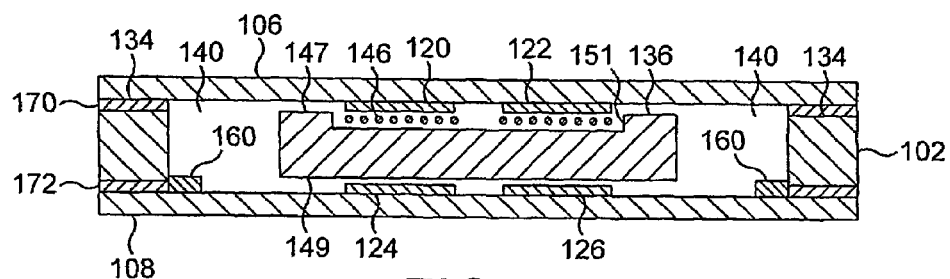
FIG. 6 is a cross-section through an electromechanical generator in accordance with another embodiment of the present invention.

As shown in FIG. 6, which is a cross-section along line X-X of FIG. 5 but of a different embodiment, the coil comprises a wire coil 146, which is incorporated into the electromagnetic generator, instead of forming the coil 146 on the surface of the central layer 102. In this embodiment, a wire wound coil 146 is provided on one of the two opposite faces 147, 149 of the paddle 136. Thus a pre-formed wire coil may be attached, for example by adhesive, on to one surface of the paddle 136. If desired, the coil 146 may be disposed in a respective etched recess 151 formed in the surface of the paddle 136 in order to accommodate the wound coil 146. This particular embodiment offers the advantage of a high level of performance as a result of the provision of a wound coil, coupled with the excellent mechanical properties of silicon which forms the paddle 136 together with the integral cantilever beam element 138. If desired, two coils 146 may be provided, one on each face 147, 149 of the paddle 136.

In accordance with the preferred method of the invention, wafer processing is employed to produce the outer layers 106, 108 and the central layer 102. In other words, an array of a plurality (typically hundreds) of outer layers 106, 108 are respectively simultaneously produced on two first wafers, and an array of a plurality (correspondingly, typically hundreds) of central layers 102 are produced on another single second wafer, and then those wafers (two first wafers and one second wafer) are bonded together, for example by electrostatic or silicon fusion bonding, to form a unitary multilayer structure. This multilayer structure is then cut up into a plurality of individual three layer devices 101, and then bonding wires 118 are attached to each device 101. Each device 101 is then encapsulated, if desired, into a respective housing (not shown).

Although the electromagnetic generator of the illustrated embodiment incorporates a three layer structure, in accordance with other aspects of the invention the electromagnetic generator may incorporate a stack or array of plural three layer units in order to achieve higher output power.

In the illustrated embodiment, the electromagnetic generator includes four magnets, two magnets being disposed on each side of the coil. This configuration creates a magnetic field through a greater proportion of the length of each winding as compared to other configurations employing double magnet designs (one magnet on each side of the coil). This therefore reduces the resistive losses in the coil windings by shortening the coil for a given degree of electromagnetic coupling. However, the present invention may employ only two magnets, one on each side of the coil.

Also, it is optional for a keeper element to be provided for each magnet pair on each side of the coil, the keeper contacting both of the opposite polarity faces of the two magnets of each pair.

The coil is characterised by the proportion of the coil that passes through the magnetic field, the number of turns in the coil, and its series resistance. Second-order effects such as coil inductance can often be ignored due to the low frequency of many applications. As disclosed above, two types of coil may be used in the present invention: wound coils, and printed coils.

A printed coil can be formed by screen-printing layers of conductive materials and insulators onto a substrate in much the same manner as printed circuit boards (PCBs) are produced. A printed coil can be made very thin as printed layers will typically be 10 µm thick, making this approach particularly attractive for small-scale devices. A printed coil may also be easier to manufacture as it only involves standard thick-film printing processes, as opposed to a wound coil, which becomes more difficult to manufacture particularly as the scale decreases. The disadvantage of a printed coil is that the small thickness of each layer will result in a high series resistance for the coil. If windings of a larger thickness than are traditionally available from thick-film technology (e.g. >50 µm) are required a wound coil will be more suitable and economic to manufacture. Printed coils have the added advantage of already being attached to a substrate, which may add rigidity to the coil, and hence decrease the clearance required between the coil and the magnets of the outer layers. Additionally the coil may be formed by lithographic processes such as are those used to define structures on a silicon wafer in the technical field of micro-engineering. These processes are well known in the prior art and successive layers can be built up by a variety of processes such as sputtering, evaporation or electroplating and are not limited to deposition on silicon wafers but can be applied to any wafer like substrate.

For efficient energy conversion, it is desired that the beam element carrying the paddle be excited at its resonant frequency. This resonant frequency is sensitive to beam amplitude and environmental temperature. It is also desired to determine the maximum beam amplitude that should be allowed to prevent damage through over straining the beam material. Preferably, the design includes a vacuum-sealed housing so that a vacuum surrounds the entire device. The vacuum could be produced within the cavity 117, which includes the cutout 140, during the wafer bonding process.

In the illustrated embodiment, although each block-shaped magnet having a longitudinal direction extending between the ends of opposite polarity of the magnet is shown to have a rectangular transverse cross-section, the cross-section may be varied, for example by providing a circular cross-section.

In an alternative embodiment, the coil is in a fixed position and the magnets are adapted for movement relative to the coil as a result of mechanical vibration imparted to the electromechanical generator. Thus, the magnets are carried on one or more vibratable paddles and the coil is mounted or provided on a solid layer of the multilayer device.

In accordance with the invention, by employing wafer processing and thick film technology to produce a miniature electromagnetic generator, the device can readily be batch fabricated, thus achieving low production cost. Furthermore, such devices are readily miniaturised, yet have high reliability as a result of using known production steps which are readily controllable.

Yet further, in one particularly preferred aspect of the present invention, by combining electromagnetic and piezoelectric harvesting of electrical energy from a common input of vibrational energy, this can yield a very efficient device.

Figure 7:
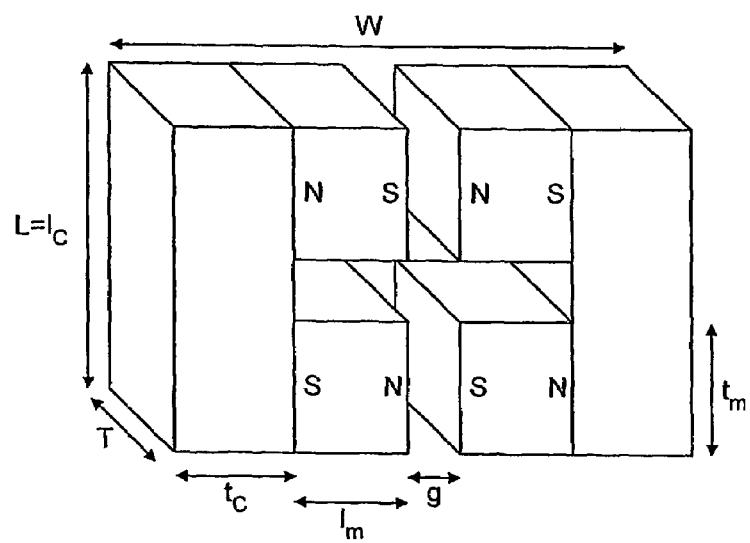
FIG. 7 is a schematic side elevation of a magnetic core structure for an electromechanical generator in accordance with a further embodiment of the present invention.

Referring to FIG. 7, there is shown a magnetic core structure for an electromechanical generator in accordance with another embodiment of the present invention.

Figure 1:
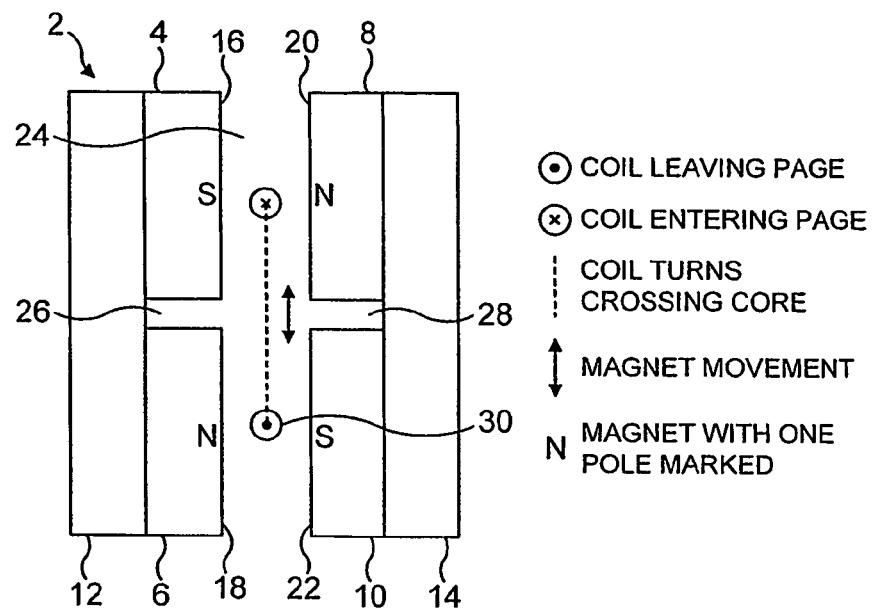
FIG. 1 is a schematic side elevation of a configuration for the magnets, core and coil of a known electromagnetic device for converting mechanical vibrational energy into electrical energy.

The magnetic core structure, designated generally as 202, in FIG. 7 has substantially the same general structural configuration as the known magnetic core structure of FIG. 1. Thus the magnetic core structure 202 comprises four magnets 204,206,208,210. Each magnet 204,206,208,210 is substantially block shaped having opposed ends of opposite polarity. The four magnets 204,206,208,210 are disposed in two magnet pairs, with each pair of magnets 204,206,208,210 being assembled with a respective keeper plate 212,214 of ferromagnetic material, for example steel. For each pair of magnets 204,206,208,210, the end of one magnet (for example magnet 204) having a first polarity (for example N for the magnet 204 in FIG. 7) is assembled against the respective keeper plate (for example keeper plate 212 in FIG. 7) and an end of opposite polarity (for example S) of the other magnet (magnet 206 in FIG. 7) is assembled against the same keeper plate (keeper plate 212). The two pairs of magnets 204,206, 208,210 are mounted in an opposing manner, with magnet ends 216,218;220,222 of opposite polarity spaced from and facing each other, and with the magnetic flux being guided around the two opposed outside edges of the magnetic core 202 by means of the two keeper plates 212,214, thereby to define a magnetic circuit.

With this arrangement, a single elongate slot 224 is defined between the two opposed magnet pairs 204,206 and 208,210 and there are also defined in the magnetic circuit two air gaps 226,228 therein, each air gap 226,228 being defined between respective opposed magnet ends 216,218;220,222. As shown in FIG. 1, the coil is disposed in the slot 224. The magnetic circuit is mounted on a cantilever beam, for example a U-shaped member, with each end of the U-shaped number connected to a respective pair of magnets 204,206,208,210. When the electromechanical generator is subject to mechanical vibration, the cantilever beam can correspondingly vibrate, in an up and down direction with respect to the magnetic circuit shown in FIG. 7, and as shown by the arrows indicating magnet movement in FIG. 1. During normal operation, the beam amplitude is not large enough to cause the coil to leave the air gaps 226,228, between the opposed ends 216,218;220,222 of the magnets. When the magnetic core 202 is in its rest position in the absence of any vibration, the cantilever beam is in a central position, and both the upper and lower portions 232,234 of each turn of the coil pass through the magnetic field generated by the magnetic circuit, as shown in FIG. 1.

To improve the degree of coupling, it is desirable to choose a type of magnet that will produce a strong flux density. Rare earth magnets are ideal for this application, and offer up to 5 times the magnetic energy density of conventional Alnico magnets. Neodymium Iron Boron (NdFeB) magnets have the most powerful magnetic properties per cubic cm known at this time, and can operate at up to 120° C. If higher temperature operation is required, the less powerful Samarium Cobalt can be used, with a working temperature of up to 250° C.

When the magnetic circuit comprising the magnetic core, and the coil that resides in the magnetic field created by the core, are arranged as shown in FIG. 1, this configuration, which is based on four magnets, creates a magnetic field through a greater proportion of the length of each winding as compared to other configurations employing double or single magnet designs. This therefore reduces the resistive losses in the coil windings by shortening the coil for a given degree of electromagnetic coupling.

The coil is characterised by the proportion of the coil that passes through the magnetic field, the number of turns in the coil, and its series resistance. Second-order effects such as coil inductance can often be ignored due to the low frequency of many applications. Two types of coil may be used in the present invention: wound coils, and printed coils.

A printed coil can be formed by screen printing layers of conductive materials and insulators onto a substrate in much the same manner as printed circuit boards (PCBs) are produced. A printed coil can be made very thin as printed layers will typically be 10 µm thick, making this approach particularly attractive for small-scale devices. A printed coil may also be easier to manufacture as it only involves standard thick-film printing processes, as opposed to a wound coil, which becomes more difficult to manufacture particularly as the scale decreases. The disadvantage of a printed coil is that the small thickness of each layer will result in a high series resistance for the coil. If windings of a larger thickness than are traditionally available from thick-film technology (e.g. >50 µm) are required a wound coil will be more suitable and economic to manufacture. Printed coils have the added advantage of already being attached to a substrate, which may add rigidity to the coil, and hence decrease the clearance required between the coil and the magnetic core. Additionally the coil may be formed by lithographic processes such as are those used to define structures on a silicon wafer in the technical field of microengineering. These processes are well known in the prior art and successive layers can be built up by a variety of processes such as sputtering, evaporation or electroplating and are not limited to deposition on silicon wafers but can be applied to any wafer like substrate.

In an embodiment of the electromagnetic generator of the present invention a hand wound coil was attached to an etched stainless steel cantilever to form an inertial mass. NdFeB magnets were held rigidly with respect to the cantilever with each magnet pair being in an enclosure of an epoxy resin. An embodiment of such an electromagnetic generator based around a moving coil between four magnets is capable of generating useful power levels from ambient vibrations. For example, such a device produced an average power of 157 µW, and a peak power of 3.9 mW when mounted on the engine block of a car. A typical initial coil voltage amplitude was 250 mV.

For efficient energy conversion, it is desired that the beam be excited at its resonant frequency. This resonant frequency is sensitive to beam amplitude, environmental temperature, and small variations in the clamping position. It is also desired to determine the maximum beam amplitude that should be allowed to prevent damage through over straining the beam material. Preferably, the design includes a vacuum-sealed cover so that a vacuum surrounds the beam.

In the illustrated embodiment, although each block-shaped magnet 204,206,208,210, having a longitudinal direction extending between the ends of opposite plurality of the magnet 204,206,208,210, is shown to have a rectangular transverse cross-section, the cross-section may be varied, for example by providing a circular cross-section.

Furthermore, although each keeper plate 212,214 is also shown as being a rectangular block, the shape of the keeper plate 212,214 can be varied, for example by having a transverse cross-section which is other than rectangular and/or a cross-section which varies in cross-sectional area In an alternative embodiment, the magnetic core 202 is in a fixed position and the coil is adapted for movement relative to the magnetic core 202 as a result of mechanical vibration imparted to the electromechanical generator.

Referring to FIG. 7, in accordance with the present invention, the present inventors have found that a particular shape and configuration for the magnetic design provides improved energy conversion efficiency for converting mechanical vibrational energy into electrical energy. As shown in FIG. 7, the magnets 204,206,208,210 have a core length, $l_m$, and thickness, $t_m$. The ferromagnetic keeper plates 212,214 have length, $l_c$, and thickness, $t_c$. The width of the air gaps 226,228 between the respective magnet pairs 204,206,208,210 is given by g. The depth of all the components, comprising the magnets 204,206,208,210 and the keeper plates 212,214, is equal, and is given by T. The overall width of the magnetic core is given by W and the overall length L of the magnetic core is the same as the length $l_c$ of the keeper plates 212,214. The total face area A of the two magnets is given by $2t_m T$, and the total area of the core, which is the total face area of each magnet pair plus the face area of the gap therebetween, is given by LT.

Figure 8:
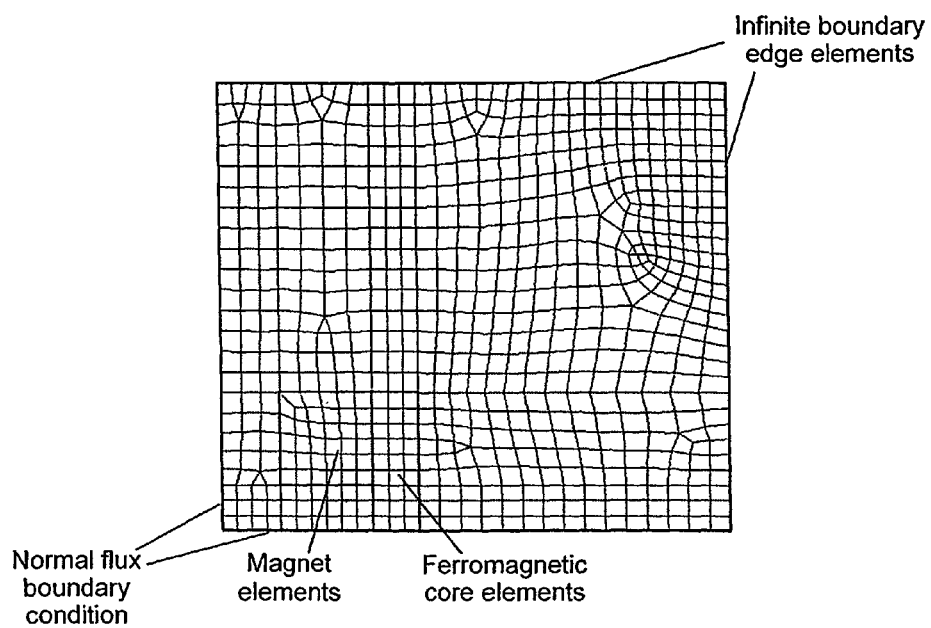
FIG. 8 shows a finite element model used in the present invention to determine the properties of a magnetic core of an electromechanical generator.

The present inventors explored the effect of core geometry on the magnetic field in the air gap by generating a finite element model. The model exploited the symmetry of the design, and simulated only a quarter section. The model was a planar one, and ignored any edge effects in the depth direction. The finite element model for a typical set of dimensions is shown in FIG. 8, and is annotated to show boundary conditions.

The ferromagnetic keepers were modelled as having a linear B-H characteristic, with a relative permeability of 5000, which is typical for Neodynium Iron Boron magnets. The exact value of the permeability is not critical, as the reluctance of the large air gaps tends to dominate the results. Saturation was ignored during the finite element analysis, but the design was checked after the modelling to ensure that saturation did not occur in the ultimate design model.

FIGS. 9, 10 and 11 show typical magnetic flux patterns which have been calculated for different extremes of geometrical configuration. Ac shown in FIG. 9, when the magnets are close together, most of the flux lines flow straight across the gap, with little leakage. As the magnets are separated to the position shown in FIG. 10, some of the flux curls around between magnets on the same side of the core. This can be partially alleviated by increasing the length of the core, as shown in FIG. 11.

A batch computer program was written by the inventors to automatically vary the geometrical parameters of the model, and calculate suitable output data. Output data included the B-field, and the value of $$\int^{airgap} B^2 dA$$

for each configuration. The value of this integral is proportional to the magnetic energy stored by the magnetic field in the air gap. Since the model was a linear one, the B-field predicted by the model was scale invariant. Thus, the parameter $t_m$ was fixed during the analysis, and the parameters g, $l_m$, and $l_c$ varied as proportions of $t_m$.

As a result of this analysis, it was found that the core thickness, $t_c$, has little effect on the resulting field pattern (so long as it is sufficiently large) and so the core thickness, $t_c$, was set to a value of $2t_m$. It was found that the effect on a typical configuration of doubling $t_c$ is to increase the average magnetic field in the air gap by only 0.3%.

After processing, the simulation yielded a 3-dimensional data set showing the results for each combination of g, $l_m$ and $l_c$. For each data point the minimum value of $t_c$ that would avoid magnetic saturation in the core was determined (assuming a value of $B_{sat}$ of 2 Tesla), which in turn permitted the total width of the core, W, to be found for each point.

The present inventors then identified and defined a variable ψ (in Tesla²) which relates to the amount of magnetic energy stored per core volume. ψ was defined as:

$$\psi = \frac{\int^{airgap} B^2 dA}{\text{total area of core}} \quad \text{(Equation 1)}$$

wherein B is the magnet flux density; and A is the total face area of each magnet pair of the core, the faces defining the air gaps (with reference to FIG. 7 this is given by $2t_m T$); and the total area of the core is the total face area of each magnet pair plus the face area of the gap therebetween (with reference to FIG. 7 this is given by LT).

The present inventors then identified and defined an equation for the parameter $P_L$, which is the useful electrical power delivered to the load, by the electromagnetic generator:

$$P_L = T \cdot H_C \cdot W \frac{(Q_{bl} \cdot \alpha \cdot \omega_n)^2}{8\left(\frac{Q_{bl}}{\left\{\frac{m}{T \cdot H_C \cdot W}\right\}\omega_n} + \left[\frac{\rho}{g \cdot B^2}\right]\right)} \quad \text{(Equation 2)}$$

where: $P_L$ is the useful electrical power delivered to the load;
m is the total mass of the core shown in FIG. 7;
$\omega_n$ is the system natural circular frequency;
B is the magnet flux density;
α is the peak amplitude excitation of the vibrations;
$Q_u$ is the unwanted damping;
g is the gap length g in FIG. 7;
ρ is the resistivity of the coil in Ohm cm;
T is given by the depth T in FIG. 7;
$H_c$ is given by $l_c$ in FIG. 7; and
W is the length W in FIG. 7 (the magnetic core of the electromagnetic generator would thereby fit within an enclosure (box) of length, W; height, $H_c$; and depth, T).

The importance of the parameter ψ in Equation 1 for a core in a generator design can be appreciated by examining Equation 2, wherein the term in square brackets [ . . . ] in Equation 2 is equal to the value of the variable ψ in Equation 1. The present inventors have therefore found that it is possible to maximise the value of the variable ψ by selection of the geometry of the magnets and keeper plates of the magnetic core structure shown in FIG. 7. This in turn allows the maximisation of the electrical power which can usefully be provided by a vibration based generator of the geometry shown in FIG. 7. The finding by the present inventors that there is a geometrical configuration providing a maximum value for ψ, is not derivable from the prior art, and provides a technical advantage over the prior art by providing a structure for an electromagnetic generator which enables maximisation of the electrical power output for a given set of external dimensions.

There are two other terms in Equation 2 that also depend on the geometrical configuration in the expression for $P_L$. The first is the amount of unwanted damping, represented by $Q_u$; this will be a complicated function of geometrical parameters, beam amplitude, and other factors such as details of the spring clamping at the beam root, that are not modelled in this analysis. It is acknowledged that variations in this parameter will have a significant effect on the power output but this is not a parameter over which the designer has control.

The second is the term in curly brackets $\{\ldots\}$ that represents the average density of the core, excluding the mass of the coil. There may be cases (especially at low excitation) when more power could be generated by decreasing the gap, g. By doing this the electromagnetic coupling (and hence $\psi$) will be reduced, but the mass will be increased. However the ability of the designer to reduce this gap g is limited by the size of the coil which must fit in this gap. This parameter is therefore not under control of the designer.

Therefore, for a given level of damping and coil size, the inventors have found that maximising the variable $\psi$ is the key to ensure maximum power is generated in the load (i.e. maximum energy conversion efficiency).

Accordingly, as a result of examining the data-set from the batch program, it has been found by the present inventors that there exists a single maximum for $\psi$ in the three-dimensional parameter space of $g/t_m$, $l_m/t_m$, $l_c/t_m$.

The most preferred dimensional relationships, based on the maximum value for $\psi$, are listed in Table 1.

TABLE 1

| Parameter | Value | Error (%) |
|---|---|---|
| $W/l_c$ | 0.71 | 6 |
| $l_m/l_c$ | 0.17 | 24 |
| $g/l_c$ | 0.195 | 15 |
| $t_m/l_c$ | 0.48 | 2 |
| $t_c/l_c$ | 0.087 | 12 |
| $\Psi = \psi_{max}$ | 0.0491 | 0.5 |
| Average B-field | 0.366 | 11 |

The error associated with each of the entries in the table estimates the error between the stated value, and the actual value of the parameter at the maximum. The error is a result of numerical noise in the output data, which is caused by non-ideal element shapes in thinner areas of the model. This noise blurs the position of the maximum. It should be noted that $\psi$ tends to decrease more slowly as g and $l_c$ are increased from their most preferred value than if these quantities are decreased. Thus to ensure a good value of $\psi$ in a design, it is better to err on the side of large g and $l_c$.

In practice, the parametric ratios are encompassed within ranges, which may result from production tolerances, which preferably correspond approximately to a +/−10% variation in generator efficiency.

When the parameters are selected in accordance with the most preferred dimensional relationships as specified in Table 1, the magnetic field pattern for the magnetic core design is as shown in FIG. 12.

The parametric ratio $t_m/l_c$ is of high importance in obtaining high efficiency because it relates to the magnet geometry. In accordance with the invention, the parametric ratio $t_m/l_c$ ranges from 0.40 to 0.55, preferably from 0.43 to 0.53, and most preferably is about 0.48.

The parametric ratio $l_m/l_c$ is of high importance in obtaining high efficiency because it also relates to the magnet geometry. In accordance with the invention, the parametric ratio $l_m/l_c$ preferably ranges from 0.1 to 0.24, and most preferably is about 0.17.

When the magnets are close together, i.e. with a low value of the parameter g, most of the flux lines flow straight across the gap, with little leakage. As the magnets are increasingly separated some of the flux curls around between magnets on the same side of the core. If the magnets are too close there is no space for the coil. In accordance with the invention, the parametric ratio $g/l_c$ preferably ranges from 0.14 to 0.26, and most preferably is about 0.20.

The parametric ratio $t_c/l_c$ is dependent on the thickness of the ferromagnetic keeper which has a limited influence on efficiency. In accordance with the invention, the parametric ratio $t_c/l_c$ preferably ranges from 0.06 to 0.12, and most preferably is about 0.09.

The parametric ratio $W/l_c$ is dependent on the overall device width, which in turn is controlled by $t_c$, $l_m$ and g. In accordance with the invention, the parametric ratio $W/l_c$ preferably ranges from 0.61 to 0.81, and most preferably is about 0.71.

The parameter $\psi$ preferably has a value of from 0.04 to 0.06 Tesla$^2$, more preferably a value of about 0.05 Tesla$^2$.

It should also be noted that if the dimensions determining the maximum size of the electromechanical generator are not of the correct proportions to produce this optimum design, the optimum value can be approached by splitting the available volume into several smaller volumes of a more ideal proportion.

The invention claimed is:

1. A magnetic core for an electromagnetic generator, the magnetic core comprising four magnets disposed in two magnet pairs, with each pair of magnets being assembled with a respective keeper, the two pairs of magnets being mounted in an opposing manner so that a front end of each magnet of one magnet pair is spaced, in a first direction, from and faces a front end of a corresponding magnet of the other magnet pair, the facing front ends being of opposite magnetic polarity, thereby to define in the magnetic core a pair of gaps between the front ends of the four magnets, and with rear ends of the magnets of each pair contacting a respective keeper, the magnets of each pair being mutually spaced in a second direction, and wherein the ratio between the width of each magnet in the second direction to the height of the magnetic core in the second direction is from 0.40 to 0.55.

2. A magnetic core according to claim 1 wherein the ratio between the width of each magnet in the second direction to the height of the magnetic core in the second direction is from 0.43 to 0.53.

3. A magnetic core according to claim 2 wherein the ratio between the width of each magnet in the second direction to the height of the magnetic core in the second direction is about 0.48.

4. A magnetic core according to any one of claims 1 to 3 wherein the ratio between the length of each magnet in the first direction to the height of the magnetic core in the second direction is from 0.1 to 0.24.

5. A magnetic core according to claim 4 wherein the ratio between the length of each magnet in the first direction to the height of the magnetic core in the second direction is about 0.17.

6. A magnetic core according to any one of claims 1 to 5 wherein the ratio between the length of each gap in the first direction to the height of the magnetic core in the second direction is from 0.14 to 0.26.

7. A magnetic core according to claim 6 wherein the ratio between the length of each gap in the first direction to the height of the magnetic core in the second direction is about 0.2.

8. A magnetic core according to any one of claims 1 to 7 wherein the ratio between the thickness of each keeper in the first direction to the height of the magnetic core in the second direction is from 0.06 to 0.12.

9. A magnetic core according to claim 8 wherein the ratio between the thickness of each keeper in the first direction to the height of the magnetic core in the second direction is about 0.09.

10. A magnetic core according to any one of claims 1 to 9 wherein the ratio between the length of the magnetic core in the first direction to the height of the magnetic core in the second direction is from 0.61 to 0.81.

11. A magnetic core according to claim 10 wherein the ratio between the length of the magnetic core in the first direction to the height of the magnetic core in the second direction is about 0.71.

12. A magnetic core according to any one of claims 1 to 11 wherein the parameter $\Psi$, which is defined by the equation $$\psi = \frac{\int^{airgap} B^2 dA}{\text{total area of core}},$$

wherein B is the magnet flux density; and

A is the total face area of each magnet pair of the core, the faces defining the gaps; and the total area of the core is the total face area of each magnet pair plus the face area of the gap therebetween, has a value of from 0.04 to 0.06 Tesla$_2$.

13. A magnetic core according to claim 12 wherein the parameter $\Psi$ has a value of about 0.05 Tesla$_2$.

14. A magnetic core according to any one of claims 1 to 13 wherein the average magnetic field across the gaps is about 0.366 Tesla.

15. An electromagnetic generator, the electromagnetic generator comprising a magnetic core according to any one of claims 1 to 14, a coil disposed in the pair of gaps and a vibration sensitive mount for mounting one of the magnetic core and the coil whereby vibration of the electromagnetic generator causes relative movement of the magnetic core and the coil thereby to generate an electrical current in the coil.

16. A method of producing a magnetic core for an electromagnetic generator, the magnetic core comprising four magnets disposed in two magnet pairs, with each pair of magnets being assembled with a respective keeper, the two pairs of magnets being mounted in an opposing manner so that a front end of each magnet of one magnet pair is spaced, in a first direction, from and faces a front end of a corresponding magnet of the other magnet pair, the facing front ends being of opposite magnetic polarity, thereby to define in the magnetic core a pair of gaps between the front ends of the four magnets, and with rear ends of the magnets of each pair contacting a respective keeper, the magnets of each pair being mutually spaced in a second direction, the method comprising the steps of:

(a) establishing a model for the geometrical parameters of the magnetic core, the parameters including the width of each magnet in the second direction ($t_m$), the height of the magnetic core in the second direction ($l_c$), the length of each magnet in the first direction ($l_m$) and the length of the gap in the first direction (g);

(b) varying the parameters to provide an output value $\Psi$ in units of Tesla$_2$ which is defined by the equation $$\psi = \frac{\int^{airgap} B^2 dA}{\text{total area of core}};$$

wherein B is the magnet flux density; and

A is the total face area of each magnet pair of the core, the faces defining the air gaps; and the total area of the core is the total face area of each magnet pair plus the face area of the gap therebetween;

(c) determining a maximum for the parameter $\Psi$;

(d) determining values of at least the parameters ($t_m$), ($l_c$), ($l_m$) and (g) to provide a range for the parameter $\Psi$ which encompasses the maximum for the parameter $\Psi$; and (e) producing the magnetic core having the determined values of the parameters ($t_m$), ($l_c$), ($l_m$) and (g) within a particular tolerance.

17. A method according to claim 16 wherein the ratio between the width of each magnet in the second direction ($t_m$) to the height of the magnetic core in the second direction ($l_c$) is from 0.40 to 0.55.

18. A method according to claim 17 wherein the ratio between the width of each magnet in the second direction ($t_m$) to the height of the magnetic core in the second direction ($l_c$) is from 0.43 to 0.53.

19. A method according to claim 18 wherein the ratio between the width of each magnet in the second direction ($t_m$) to the height of the magnetic core in the second direction ($l_c$) is about 0.48.

20. A method according to any one of claims 16 to 19 wherein the ratio between the length of each magnet in the first direction ($l_m$) to the height of the magnetic core in the second direction ($l_c$) is from 0.1 to 0.24.

21. A method according to claim 20 wherein the ratio between the length of each magnet in the first direction ($l_m$) to the height of the magnetic core in the second direction ($l_c$) is about 0.17.

22. A method according to any one of claims 16 to 21 wherein the ratio between the length of each gap (g) in the first direction to the height of the magnetic core in the second direction ($l_c$) is from 0.14 to 0.26.

23. A method according to claim 22 wherein the ratio between the length of each gap (g) in the first direction to the height of the magnetic core in the second direction ($l_c$) is about 0.20.

24. A method according to any one of claims 16 to 23 wherein the ratio between the thickness of each keeper in the first direction ($t_c$) to the height of the magnetic core in the second direction ($l_c$) is from 0.06 to 0.12.

25. A method according to claim 24 wherein the ratio between the thickness of each keeper in the first direction ($t_c$) to the height of the magnetic core in the second direction ($l_c$) is about 0.09.

* * * * *